(12) United States Patent
Spray

(10) Patent No.: US 9,669,810 B2
(45) Date of Patent: Jun. 6, 2017

(54) BRAKE ASSEMBLY INCLUDING INDEPENDENTLY ACTIVATABLE BRAKE ACTUATORS

(75) Inventor: Matthew Spray, Elkhart, IN (US)

(73) Assignee: Honeywell International Inc., Morris Plains, NJ (US)

( * ) Notice: Subject to any disclaimer, the term of this patent is extended or adjusted under 35 U.S.C. 154(b) by 992 days.

(21) Appl. No.: 13/347,282

(22) Filed: Jan. 10, 2012

(65) Prior Publication Data

US 2013/0175403 A1    Jul. 11, 2013

(51) Int. Cl.
    *B60T 8/17*    (2006.01)
(52) U.S. Cl.
    CPC .................. *B60T 8/1703* (2013.01)
(58) Field of Classification Search
    CPC ..................................... B60T 8/1703
    USPC .............. 188/71.5, 72.4, 158, 156, 161, 162
    See application file for complete search history.

(56) References Cited

U.S. PATENT DOCUMENTS

| | | | |
|---|---|---|---|
| 4,252,379 A | | 2/1981 | Falk |
| 4,477,122 A | | 10/1984 | Hayashida |
| 4,491,202 A | * | 1/1985 | Schmitt ......................... 188/71.5 |
| 4,824,183 A | | 4/1989 | Uchida et al. |
| 4,834,465 A | | 5/1989 | Guichard et al. |
| 4,848,852 A | * | 7/1989 | Inoue et al. .............. 188/106 P |
| 4,852,950 A | | 8/1989 | Murakami |
| 5,397,173 A | | 3/1995 | Bourguet |
| 6,193,326 B1 | | 2/2001 | Ybert |
| 6,196,359 B1 | * | 3/2001 | Daudi ....................... 188/106 P |
| 6,205,375 B1 | | 3/2001 | Naito |
| 6,257,681 B1 | | 7/2001 | Bartram |
| 6,517,171 B2 | | 2/2003 | Oshiro et al. |
| 6,672,688 B2 | | 1/2004 | Gale et al. |
| 6,820,946 B2 | | 11/2004 | Salamat et al. |

(Continued)

FOREIGN PATENT DOCUMENTS

| | | |
|---|---|---|
| CN | 1446158 A | 10/2003 |
| DE | 3941409 C1 | 4/1991 |

(Continued)

OTHER PUBLICATIONS

Examination Report from counterpart EPC Application No. 13150425.0, dated May 22, 2013, 4 pages.

(Continued)

*Primary Examiner* — Thomas J Williams
(74) *Attorney, Agent, or Firm* — Shumaker & Sieffert, P.A.

(57) ABSTRACT

A braking system may include a plurality of independently activatable groups of brake actuators, which may allow the braking force applied to a brake disc stack to be modified, e.g., in response a type of braking event. In some examples, a braking system comprises a brake assembly that includes a brake stack and a plurality of brake actuators. Each brake actuator may be configured to compress the brake stack when the brake actuator is activated. The braking system may further comprise a processor configured to detect a first type of braking event and, in response, activate a first number of brake actuators to compress the brake stack. The processor may further be configured to detect a second type of braking event and, in response, activate a second number of brake actuators to compress the brake stack, the first number being less than the second number.

19 Claims, 6 Drawing Sheets

(56) References Cited

U.S. PATENT DOCUMENTS

| | | | |
|---|---|---|---|
| 7,673,948 B2 | 3/2010 | Otomo | |
| 7,789,469 B2 * | 9/2010 | DeVlieg et al. | 303/3 |
| 7,878,602 B2 * | 2/2011 | DeVlieg et al. | 303/3 |
| 8,118,373 B2 * | 2/2012 | DeVlieg et al. | 303/126 |
| 8,312,973 B2 * | 11/2012 | DeVlieg et al. | 303/126 |
| 2003/0010583 A1 | 1/2003 | Arnold et al. | |
| 2008/0030069 A1 | 2/2008 | Griffith et al. | |
| 2008/0258548 A1 * | 10/2008 | May | B60T 8/1703 303/139 |
| 2010/0222942 A1 | 9/2010 | Devlieg et al. | |
| 2011/0187180 A1 | 8/2011 | Frank | |
| 2011/0226569 A1 | 9/2011 | Devlieg | |

FOREIGN PATENT DOCUMENTS

| | | |
|---|---|---|
| EP | 0 980 807 A2 | 2/2000 |
| GB | 698383 A | 2/1948 |
| JP | 2008037416 A | 2/2008 |
| WO | 0212043 A1 | 2/2002 |

OTHER PUBLICATIONS

Response to Examination Report from counterpart EPC Application No. 13150425.0, submitted Sep. 9, 2013, 19 pages.

Second Office Action, and translation thereof, from counterpart Chinese Patent Application No. 201310086144.9, dated Aug. 3, 2016, 13 pages.

First Office Action and Search Report, and translation thereof, from counterpart Chinese Application No. 201310086144.9, dated Nov. 18, 2015, 17 pages.

European Search Report from counterpart Application No. 13150425.0, dated May 7, 2013, 3 pages.

Third Office Action and Search Report, and translation thereof, from counterpart Chinese Application No. 201310086144.9, dated Jan. 12, 2017, 13 pp.

* cited by examiner

BRAKE ASSEMBLY INCLUDING INDEPENDENTLY ACTIVATABLE BRAKE ACTUATORS

TECHNICAL FIELD

This disclosure relates to a vehicle braking system.

BACKGROUND

An aircraft braking system may be used for various purposes, such as for slowing or stopping the aircraft while maneuvering on the ground. For example, when a jet-powered aircraft lands, the aircraft braking system, various aerodynamic drag sources (e.g., flaps, spoilers, and the like), and, in some cases, aircraft thrust reversers, are used to slow the aircraft down in the desired amount of runway distance. Once the aircraft is sufficiently slowed, and is taxiing from the runway toward its ground destination, the aircraft braking system may be used slow the aircraft, and bring it to a stop at its final ground destination.

In some aircraft braking systems, one or more rotatable friction members (sometimes referred to as "rotors") are mechanically connected to one or more wheels of the vehicle, e.g., via an axle or the like. One or more stationary friction members (sometimes referred to as "stators") may be mechanically connected to the body of the aircraft. The rotatable and stationary friction members may be arranged to define a brake disc stack (e.g., the members may be alternately splined to a torque tube or wheel rim of an aircraft wheel). To produce a desired braking force, the rotatable and stationary friction members are engaged (e.g., pressed together) with each other by a brake actuator. The friction between the rotatable and stationary friction members dissipates the energy of the moving aircraft, causing the aircraft to slow down or stop.

SUMMARY

In general, this disclosure relates to devices, systems, and techniques for independently activating a plurality of brake actuators of an aircraft wheel brake assembly of an aircraft braking system, where the brake actuators are each configured to engage a common brake stack (associated with an aircraft wheel) in order to move the one or more rotatable friction members and the one or more stationary friction members of the brake stack into engagement with each other to generate a desired braking force. The braking force applied by to an aircraft wheel by the brake assembly can be modified by modifying the number of brake actuators that are activated. For example, when all of the multiple brake actuators of the brake assembly are fully engaged with the brake stack (e.g., a maximum hydraulic pressure or electrical energy) is applied to the brake actuators, a maximum braking force may be applied to the aircraft wheel. However, when only a subset of the brake actuators of the brake assembly are engaged with the brake stack, even when the subset of the brake actuators are fully engaged with the brake stack, less than the maximum possible braking force for which the braking assembly is configured may be applied to the aircraft wheel. In some examples, the brake actuators may be, for example, hydraulic pistons or electrically driven rams, which, when activated, force the stationary and rotatable friction members into contact with each other, causing friction that generates the braking force (e.g., that dissipates the energy of the moving aircraft), causing the aircraft to slow down or stop.

In some examples, the multiple brake actuators (associated with a common wheel) of a common brake assembly may be organized into groups of brake actuators that are each configured to be activated independently of the other groups of actuators in the brake assembly. Each group may include one or more brake actuators. By independently operating the groups of brake actuators, the amount of braking force the brake assembly generates may be controlled, e.g., to accommodate different applications of the brake assembly. For example, during a first type of braking event, such as braking to slow an aircraft during taxiing or non-emergency landing, less than all of the groups of brake actuators (e.g., a single group) of the brake assembly may be activated (e.g., to force the stationary and rotatable friction members into contact with each other), slowing the aircraft relatively gradually and reducing wear on the aircraft structure. In a second type of braking event of the brake assembly, such as during an aborted takeoff, emergency landing, or during engine run up, multiple groups of actuators (e.g., all of the groups) of the brake assembly may be activated in order to generate a greater braking force to slow the aircraft.

In one example according to the disclosure is directed to a system comprising a brake assembly comprising a brake stack, and a plurality of brake actuators, each brake actuator being configured to compress the brake stack when the brake actuator is activated. The system further comprises a processor configured to detect a first type of braking event and activate a first number of brake actuators of the plurality of brake actuators to compress the brake stack in response to detecting the first type of braking event, wherein the processor is further configured to detect a second type of braking event and activate a second number of brake actuators of the plurality of brake actuators to compress the brake stack in response to detecting the second type of braking event, the first number being less than the second number.

In another example, the disclosure is directed to a system comprising a friction brake comprising a rotating member and a stationary member, a first group of brake actuators configured to engage the rotating member and the stationary member with each other, a second group of brake actuators configured to engage the rotating member and the stationary member with each other, and a control system configured to independently activate the first group of brake actuators and the second group of brake actuators to engage the friction member and the rotating member with each other.

In another example, the disclosure is directed to a method comprising receiving, with a processor of a braking system, input indicative of a type of braking event, the braking system further comprising a brake assembly comprising a brake stack, and a plurality of brake actuators, each brake actuator being configured to compress the brake stack when the brake actuator is activated. The method further comprises determining the type of braking event based on the input, selecting one or more groups of brake actuators of the plurality of brake actuators to activate based on the determined type of braking event, and activating the brake actuators of the selected one or more groups of brake actuators.

In another example, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium may be nontransitory.

The details of one or more examples are set forth in the accompanying drawings and the description below. Other features, objects, and advantages will be apparent from the description and drawings, and from the claims.

DETAILED DESCRIPTION

Figure 1:
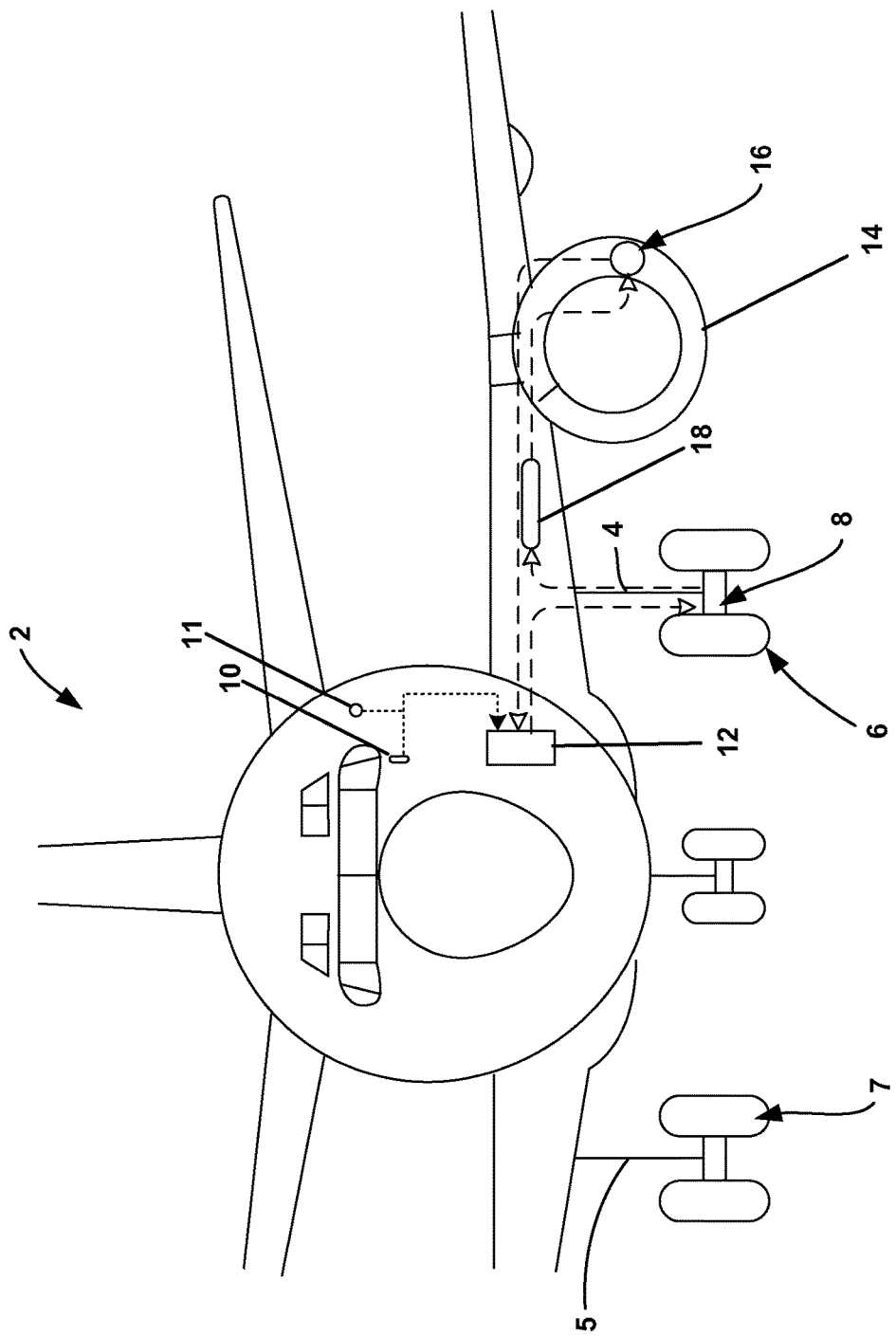
FIG. 1 is a schematic illustration of an example aircraft equipped with a braking system that includes, for a common wheel, a brake assembly including a plurality of brake actuators arranged into at least two groups of independently activatable brake actuators.

In some examples, an aircraft braking system described herein includes a plurality of brake assemblies that can be used to slow the aircraft during maneuvers on the ground. For example, the braking system can be configured such that each brake assembly may be used to slow a respective aircraft wheel (or a respective set of wheels) during a braking event. At least one of the brake assemblies of the braking system includes a brake disc stack that includes a stack of one or more rotatable friction members (referred to herein as rotors) and one or more stationary friction members (referred to herein as stators), and a plurality of brake actuators, which are each configured to apply a force to engage the rotors and stators of the brake disc stack with each other to generate friction that dissipates the energy, causing the aircraft to slow down, stop or remain stopped. As described in further detail below, the brake actuators of the plurality of brake actuators may be arranged into at least two groups that are independently activatable, e.g., such that one group (i.e., less than all of the brake actuators of the plurality) may be activated at a time or more than one group (i.e., some or all of the brake actuators of the plurality) may be activated at a time.

In some existing brake assemblies with multiple brake actuators for a single aircraft wheel or set of aircraft wheels, all of the brake actuators are activated simultaneously. As a result, a relatively large braking force may be applied to the aircraft by the braking assembly, regardless of the braking event or the braking force needs of the aircraft. The braking force of a brake assembly may be measured as, for example, the brake torque output as measured on a shaft brake test dynamometer. In contrast to these existing techniques, independently operating subsets of the brake actuators of a brake assembly may help selectively apply the appropriate amount of braking force to the aircraft wheel. For example, during some braking events (referred to herein as "normal" braking events or a "first type" of braking event for ease of description), e.g., during aircraft taxiing or non-emergency landing situations, only a subset of the brake actuators (e.g., less than all of the groups of brake actuators) of a brake assembly may be used to slow down an aircraft wheel associated with the brake assembly, such that only portion of the net braking force the brake assembly is capable of generating is used. Under these normal braking events, only the portion of the net braking force may be necessary to provide the appropriate amount of braking force. A braking event may be, for example, any event in which the brakes of the aircraft are activated or desired to slow the aircraft.

However, because the brake assembly comprises one or more other groups of brake actuators that may be also be activated to provide additional braking force, the brake assembly may have excess braking capability for emergency situations and other events (referred to herein as a "second type" of braking event for ease of description) that may require a larger braking force than normal use. When additional braking force is appropriate or desirable, one or more additional groups of brake actuators may be activated compared to the normal braking events. The additional brake actuators may apply additional force against the brake stack, thereby providing more friction that helps stop rotation of the aircraft wheel and slow the aircraft. In this way, a brake assembly described herein may operate under several different braking loads.

Additional braking force may be needed in various circumstances. For example, an aircraft may need additional braking force (compared to the normal operation) during an aborted takeoff, emergency landing, or engine run-up. In a rejected takeoff event, the aircraft may stop short during a takeoff run and does not takeoff, and, as a result, the aircraft slows abruptly from takeoff speeds. The braking system may be configured to slow the aircraft to taxi speed within the length of the runway. An emergency landing event may take place on an unpredictable landing surface with an unknown length, such that stopping the aircraft in as short of a distance as possible may be desirable. Accordingly, a larger braking force may be useful for emergency landing operations. An engine run-up event may occur in preparation for take-off or at other times. In an engine run-up event, the aircraft is held stationary by the brake force applied by the braking system as the engines of the aircraft are brought to increased (e.g., maximum) thrust. During the engine run-up event, the torque generated by the brake assemblies of a braking system needs to be sufficient to hold the aircraft in place.

In the existing brake assemblies with multiple brake actuators for a single aircraft wheel in which all of the brake actuators are activated simultaneously, the range of available braking force for which the brake assembly is configured may be relatively small, such that a relatively large braking force may be generated due to the activation of all the brake actuators, regardless of the type of braking event. Moreover, the brake assembly may be configured to provide a single maximum braking force that may be selected to be the braking force necessary during an aborted takeoff event, emergency landing event, or during an engine run-up event. For example, an existing brake assembly may be configured to provide the braking capability necessary to stop an aircraft at its maximum weight (e.g., with a maximum payload) during an aborted takeoff event or hold an aircraft in place during engine run-up, regardless of the particular braking event. Thus, in some cases, such as during normal operations (e.g., non-emergency landings or taxiing), these existing brake assemblies may apply more brake force than necessary. This may lead to, for example, braking that does not feel smooth to a passenger on the aircraft (e.g., jerky braking) due to the excessive rate of deceleration of the aircraft during the braking event.

In some cases, overuse of an unnecessarily large brake force (e.g., by simultaneous activation of all of the brake actuators), such as a maximum braking force a brake assembly is configured to generate, may fatigue the aircraft structure. For example, the use of the maximum brake force an aircraft brake assembly may generate may produce abrupt decelerations of the aircraft and generate loading in the landing gear that translates to the aircraft airframe and fatigues the airframe (and landing gear). This fatiguing may decrease the useable life of aircraft parts. Overuse of the maximum brake force or otherwise unnecessarily large braking force may result, for example, when the maximum braking force is applied every time the brake assembly is used to slow the aircraft.

A brake assembly of a braking system described herein is configured to adjust the brake force created by a brake assembly in response to a detected type of braking event. In this way, the brake assembly may adjust an applied brake force to suit the circumstances of the braking event and to accommodate variations in the desired braking force over time. Accordingly, the braking system described herein may be configured to address disadvantages that may result from applying a maximum braking force, regardless of the particular braking event, or an otherwise unnecessarily large braking force.

In some examples, a brake assembly includes at least two groups of independently activatable brake actuators, which enables the amount of force compressing (or "clamping") the rotors and stators of the brake stack of the brake assembly to be controlled by adjusting the number of brake actuators that are activated to compress the rotors and stators. As discussed above, when activated, a brake actuator applies a force to a brake stack to engage the rotors and stators together, thereby resulting in friction that helps slow an aircraft wheel with which the brake assembly is connected. Two groups of brake actuators may be configured to be independently activated when, for example, the one or more brake actuators of one group are activated while the one or more brake actuators of the other group are not. In this situation, the activated group of brake actuators applies the force to the brake stack to engage the rotors and stators together, while the non-activated group of brake actuators does not.

A first type of braking event, such as slowing the aircraft's ground speed in a standard landing, may only require a portion of the braking capacity of a brake assembly. Accordingly, in some examples, less than all of the groups of brake actuators may be activated during the first type of braking event. For example, the number of hydraulic pistons that are activated may be reduced, thereby reducing the hydraulic clamping force applied to the brake stack, and reducing the brake torque. Operating the brake assembly at a reduced capacity during normal braking events may reduce the fatiguing of the aircraft that may result during the braking event. To generate larger brake forces during a second type of braking event, e.g., during an aborted takeoff event, emergency landing event, or engine run-up event, most or all of the braking capacity of the brake assembly may be desirable. As a result, in some examples, more groups of brake actuators compared to the normal braking activities (e.g., all of the brake actuators) may be activated together to compress the rotors and stators during the second type of braking event.

As discussed in further detail below, during subsequent activations of a subset of brake actuators of a brake assembly in response to detection of the first type of braking event, a control system of the aircraft brake system can alternate between the brake actuators or groups of brake actuators that are activated to provide the braking force. In some examples, the brake control system may be configured to alternate the group of brake actuators used from one first type of braking event to the next. This may help keep all of the brake actuators of the brake system in use relatively regularly, which may help improve the lifespan of the brake actuators. For example, in a brake actuator that includes a hydraulic piston, hydraulic seals may dry and fail if not wetted with hydraulic fluid. By operating each group of brake actuators at least some of the time for the first type of braking events, the brake assembly may extend the lifespan of the brake actuator components. In addition, in examples in which the brake actuators are adjustable in response to the wear state of the brake stack, periodically changing which brake actuators are used during normal braking events may help keep the internal adjuster mechanism set to the current wear state of the brake stack. Activating different brake actuators during different normal braking events is possible because, for a given braking assembly for an aircraft wheel, only a subset of the brake actuators can be activated at a time during normal braking events.

The disclosure primarily describes the multiple actuator braking assembly as being implemented using a brake disc stack on aircraft landing gear. The techniques for selectively activating brake actuators of a brake assembly are not limited to brake disc stack type braking systems, nor to aircraft. For example, multiple independently activatable groups of actuators may also be used with a disc brake and caliper system, and other braking arrangements, found on automobiles and other wheeled vehicles. For example, some high performance automobiles may be configured to activate a first number of brake actuators to press a caliper and brake pad into engagement with a brake disc or drum during a first type of braking event (e.g., a normal braking event), and may be configured to activate a second number of brake actuators to press the caliper and brake pad into engagement with the brake disc or drum during a second type of braking event (e.g., emergency braking events or engine revving operations).

FIG. 1 is a schematic diagram illustrating an example aircraft 2 equipped with a hydraulically actuated braking system. Aircraft 2 comprises a plurality of landing gear assemblies, including landing gear assembly 4, and aircraft wheels, including wheels 6, 7 shown in FIG. 1. The braking system of aircraft 2 comprises at least one brake assembly 8, which is illustrated in FIG. 1 as being associated with landing gear assembly 4 and aircraft wheels 6, i.e., braking assembly 8 is configured to slow rotation of aircraft wheels 6 in order to slow aircraft 2 when aircraft 2 is on the ground. In some examples, the braking system of aircraft 2 further comprises additional brake assemblies, such as a brake assembly associated with a set of aircraft wheels 7 and its respective landing gear 5. In some examples, aircraft 2 may include multiple landing gear assemblies equipped with respective brake assemblies 8. These additional brake assemblies may be configured similar to brake assembly 8 in some examples. For ease of description, however, a brake assembly 8 associated with a single set of wheels 6 (adjacent to each other) and landing gear assembly 4 is described herein.

Aircraft wheels 6 are mechanically connected to aircraft 2 via landing gear assembly 4. Aircraft wheels 6 may rotate on a common axle or on separate axles (not shown) that are mechanically connected to brake assembly 8. Brake assembly 8 is configured to generate a friction force (e.g., via brake actuators that compress a brake stack) that applies a moment to the axle (or axles), slowing the rotation of the axle and aircraft wheels 6.

In the example shown in FIG. 1, the braking system of aircraft 2, including brake assembly 8, is controlled by control system 12, which is configured to receive input indicating a desired braking force from at least one of user interface 10 and sensor 11, determine which brake actuators of brake assembly 8 to activate based on the user input, and, subsequently, control the actuation of the selected brake actuators. User input 10 may be in a cockpit of aircraft 2 in some examples. In some examples, user interface 10 may be a brake pedal or similar input mechanism that a user (e.g., a pilot or other crewmember) mechanically activates to indicate braking is desired and how much braking is desired. The user may indicate, via user interface 10, how much brake force is desired. For example, the extent to which a brake pedal is depressed may indicate the amount of brake force desired by the user. In some examples, sensor 11 is a position sensor hat is configured to generate position signals representative of the position of the brake pedal may be used to determine how far the brake pedal is depressed. Control system 12, using the position signals and the known spring rate of a return spring (not illustrated) coupled to the brake pedal may determine the application force a user is supplying to the brake pedal. In some examples, the position sensor comprises a LVDT (linear variable differential transformer). Control system 12, which may determine the number of brake actuators of brake system 8 to activate based on the sensor signal. As an example, control system 12 may determine that user input provided via the brake pedal indicates a first type of braking event for which only a subset of brake actuators may be necessary to provide the desired braking force or a second type of braking event for which activation of all of the brake actuators is desirable.

In some examples, in addition to or instead of the brake pedal, user interface 10 may also include a button, keypad, a speaker for voice commands, a switch, or another user input mechanism configured to receive input that indicates, to control system 12, the occurrence of a particular braking event for which extra braking force is desirable. For example, in an emergency situation, such as an aborted takeoff or landing on a short runway, a user may actuate a switch, and, in response, a signal indicative of an emergency braking event or otherwise indicative of a request for an increase amount of braking force may be generated and transmitted to control system 12. As another example, prior to initiating engine run-up, the user may actuate a switch, and, in response, a signal indicative of a run-up event or otherwise indicative of a request for an increase amount of braking force may be generated and transmitted to control system 12. Upon receiving the signal from user interface 10, control system 12 may detect the occurrence of a second type of braking event for which an increased braking force applied by the brake system of aircraft 2 is desired and control braking assembly 8 accordingly, as described in further detail below.

In some examples, user interface 10 may also comprise a display or another mechanism for providing an output to indicate to the user, for example, that the request for additional braking force was received and that extra braking force is being applied.

Sensor 11 may be any suitable sensor that is configured to generate a signal indicative of a condition (e.g., an aircraft operating condition or a condition relating to user input) from which control system 12 may determine a type of braking event that is occurring or about to occur. In some examples, sensor 11 may be an accelerometer that indicates whether aircraft 2 is moving or even the rate of deceleration of aircraft 11. Movement of aircraft 2, e.g., in conjunction with information indicating the extent of brake pedal depression may indicate, for example, a dynamic braking event in which aircraft 2 is moving, or, in some cases, an aborted takeoff event. Lack of movement of aircraft e.g., in conjunction with information indicating the extent of brake pedal depression may indicate an engine run-up event, for which extra braking force (relative to a normal braking event) is desirable.

As another example, in addition or instead of an accelerometer, sensor 11 may include a sensor configured to indicate the rate of rotation of one or both wheels 6, from which control system 12 may determine that aircraft 2 is moving at speed at which extra braking force (relative to a normal braking event) is desirable. For example, if a first sensor indicates a rate of rotation of one or both wheels 6 is greater than or equal to a first predetermined threshold value stored by control system 12 and a second sensor indicates a brake pedal is depressed (e.g., by a threshold amount), control system 12 may detect an aborted takeoff event or an emergency landing event, and may select the brake actuators of brake assembly 8 to activate accordingly. In the case of an emergency landing event, aircraft 2 may also include another sensor configured to detect a failure to deploy flaps or other mechanical failure of aircraft 2 that may result in aircraft 2 landing at high speeds or otherwise require additional braking force, and control system may detect the emergency landing event based on that sensor signal alone or in combination with the other sensor signals described above.

As another example, if a first sensor indicates the rate of rotation of one or both wheels 6 is less than or equal to a second predetermined threshold value (same or different than the first threshold value) stored by control system 12 and a second sensor indicates a brake pedal is depressed by a user (e.g., by a threshold amount), control system 12 may detect an engine run-up event and may select number of brake actuators of brake assembly 8 to activate accordingly. In some cases, control system 12 may also receive a signal indicating that the throttle of aircraft 2 is being advanced in combination with the rate of rotation of one or both wheels 6 being less than or equal to a second predetermined threshold value and the depression of the brake pedal prior to detecting the engine run-up event.

Control system 12 is configured to receive signals from user interface 10, sensor 11, or both, and control brake assembly 8 to generate the amount of braking force based on the received signals. For example, as described in further detail below, control system 12 may, based on the signal from user interface 10, select and control one or more groups of brake actuators 24 (FIG. 2) of brake assembly 8 to activate, in order to generate braking force to slow rotation of wheels 6. In some examples, if the signals from user interface 10, sensor 11, or both, indicate a first type of braking event (e.g., a non-emergency landing or taxiing), control system 12 may control a first number of groups of brake actuators to activate. On the other hand, if the signals from user interface 10, sensor 11, or both, indicate a second type of braking event (e.g., a non-emergency landing or taxiing), control system 12 may control a second number of groups of brake actuators to activate, where the second number is greater than the first number. In some examples, the second number is all of the brake actuators of brake assembly 8.

For example, in one example, control system 12 may receive signals indicating the speed and altitude of aircraft 2 from one or more sensors 11. If the speed of aircraft 2 is zero and the aircraft is on the ground, control system 12 may determine that input from a user to actuate the brake (e.g., input received via user interface 10) indicates that the aircraft is likely about to run-up the aircraft engine, and, as a result, extra brake force to hold the aircraft substantially in place (e.g., in place or nearly in place) against increased engine thrust may be desired. Thus, in response to receiving such input from sensors 11 and user interface 10, control system 12 may detect a second type of braking event and may control brake assembly 8 to actuate a large subset or even all of the brake actuators of brake assembly 8 in order to apply extra brake force beyond dynamic braking events to slow aircraft 2.

As another example, control system 12 may receive a status signal from a sensor 11 indicating that landing gear 4 is deployed, as well a signal indicating the air speed of aircraft 2. Control system 12 may also detect whether a user has provided input via user interface 10 to indicate the occurrence of an emergency braking event. If no emergency braking event is detected, control system 12 may detect a first type of braking event (e.g., a non-emergency landing) in response to the signals from sensor 11, and control system 12 may control brake assembly 8 to actuate a first number of the brake actuators of brake assembly 8 in order to slow down aircraft 2. On the other hand, if an emergency braking event is detected, control system 12 may detect a second type of braking event (e.g., a non-emergency landing) in response to the signals from sensor 11 and user interface 10, and may control brake assembly 8 to actuate a large subset or even all of the brake actuators of brake assembly 8 in order to apply extra brake force beyond dynamic braking events to slow aircraft 2.

Figure 2:
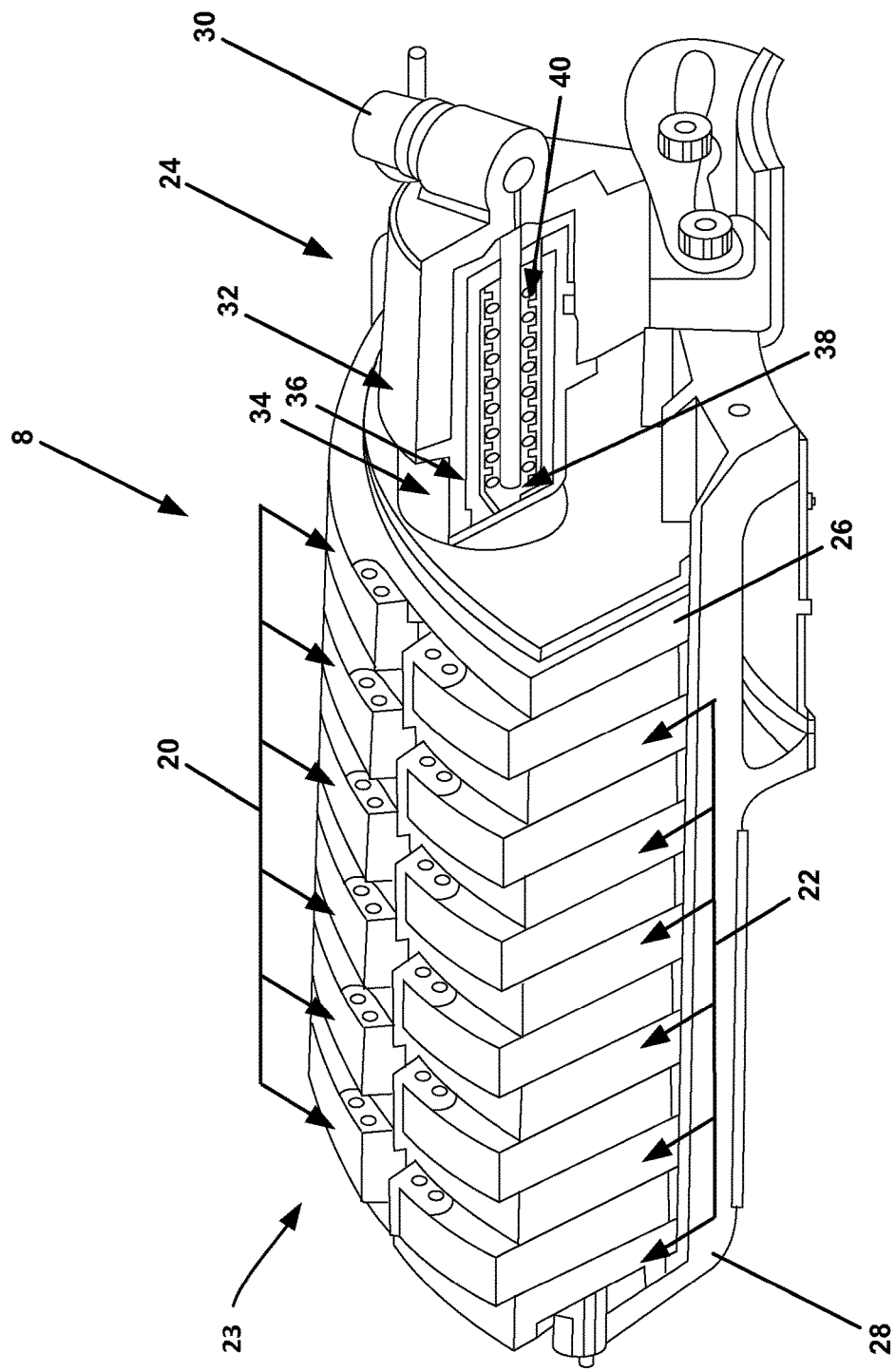
FIG. 2 is a schematic perspective view of a portion of an example brake assembly that includes a brake disc stack and a hydraulic actuator.
Figure 3:
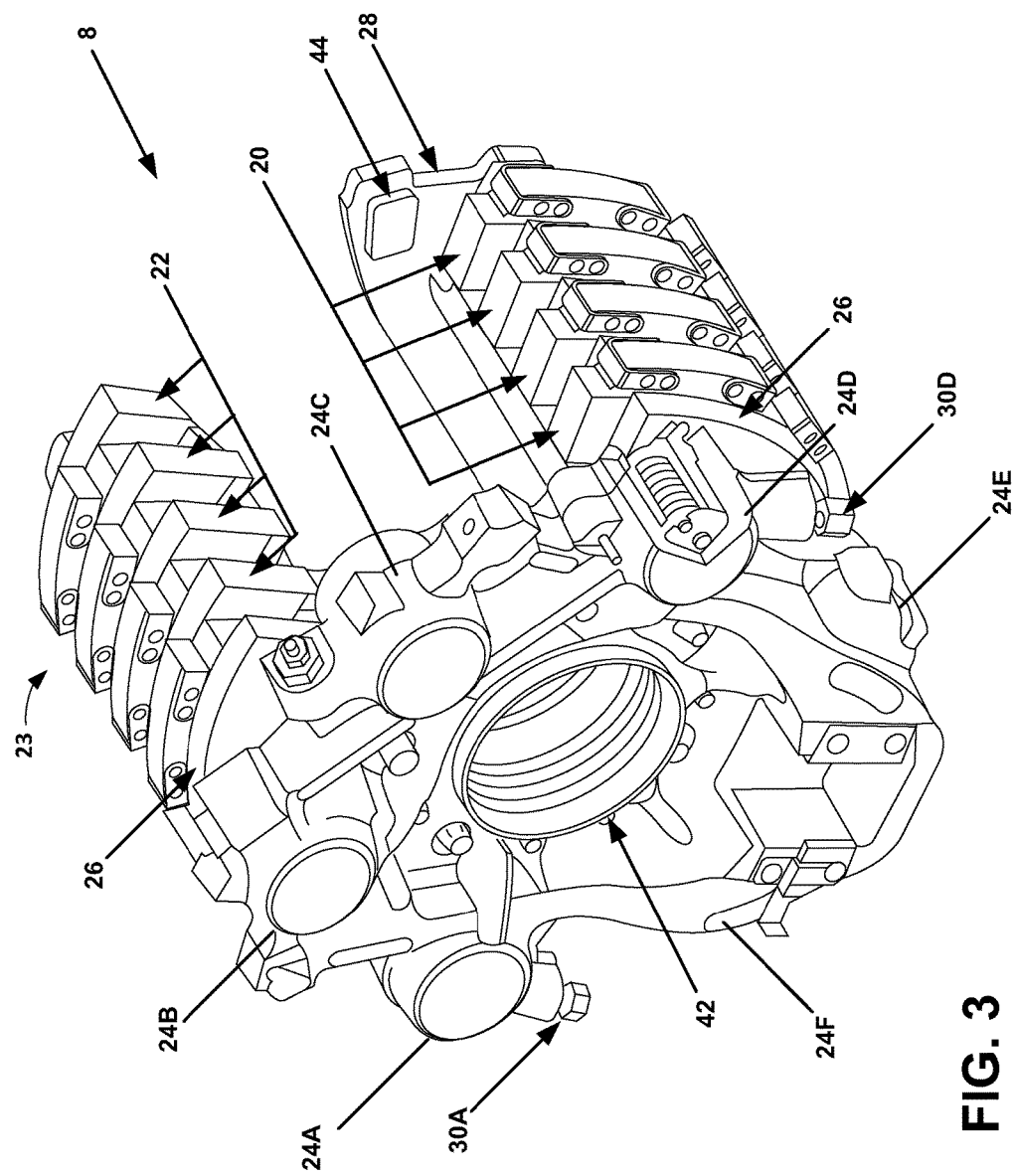
FIG. 3 is a schematic perspective view of an example brake assembly that includes multiple actuators.

As described in further detail with respect to FIGS. 2 and 3, brake assembly 8 comprises a brake disc stack that includes one or more rotors and one or more stators, and a plurality of brake actuators, which are each configured to apply a force to the brake disc stack to bring the rotors into engagement with the stators, which generates friction and causes wheels 6 to slow a speed of rotation. The brake actuators of brake assembly 8 may each include, for example, any one or more hydraulic or pneumatic pistons, motor and screw drives, electrically driven rams, and the like. Depending on the type of brake actuators included in brake assembly 8, control system 12 may control (e.g., to activate) the brake actuators of brake assembly 8 by regulating hydraulic or pneumatic pressure or electricity supplied to the brake actuators. While hydraulic brake actuators are primarily referred to herein, the devices, systems, and techniques for actively adjusting a braking force applied to wheels 6 by selectively activating independently operable brake actuators or independently operable groups of brake actuators may also be used with other types of brake actuators, such as electrical brake actuators.

In the example shown in FIG. 1, when brake actuators of brake assembly 8 are hydraulic brake actuators, aircraft 2 may include pump 16 and reservoir 18. In some examples, pump 16 may be configured to pressurize hydraulic fluid stored in reservoir 18, e.g., under the control of control system 12 or another control system. In some examples, pump 16 may be located in engine 14 of aircraft 2 and be driven by engine 14. In other examples, pump 16 may be located elsewhere aboard aircraft 12 and be driven by the electrical system of aircraft 2 or by external air routed to pump 16. Control system 12 may operate valves 56 (FIG. 4) in order to control the amount of hydraulic fluid that flows through the one or more hydraulic circuits formed by pump 16, reservoir 18, and each of the brake actuators of brake assembly 8. In some examples, hydraulic pressure and fluid may be routed through aircraft 2 via hydraulic lines, pipes, or tubing, connecting reservoir 18, pump 16, control system 12, and brake assembly 8.

In examples in which brake actuators of brake assembly 8 include electric brake actuators, the electric brake actuators may each be driven by energy stored within the electrical system aircraft 2, such as in a battery. The stored energy may be generated by a generator, e.g., an auxiliary power unit or other turbine driven by engine 14 or air flow. Control system 12 may regulate the power supplied to the individual electric brake actuator or group of brake actuators by, for example, switching a brake actuator on/off or changing the resistance of the circuit.

Figure 4:
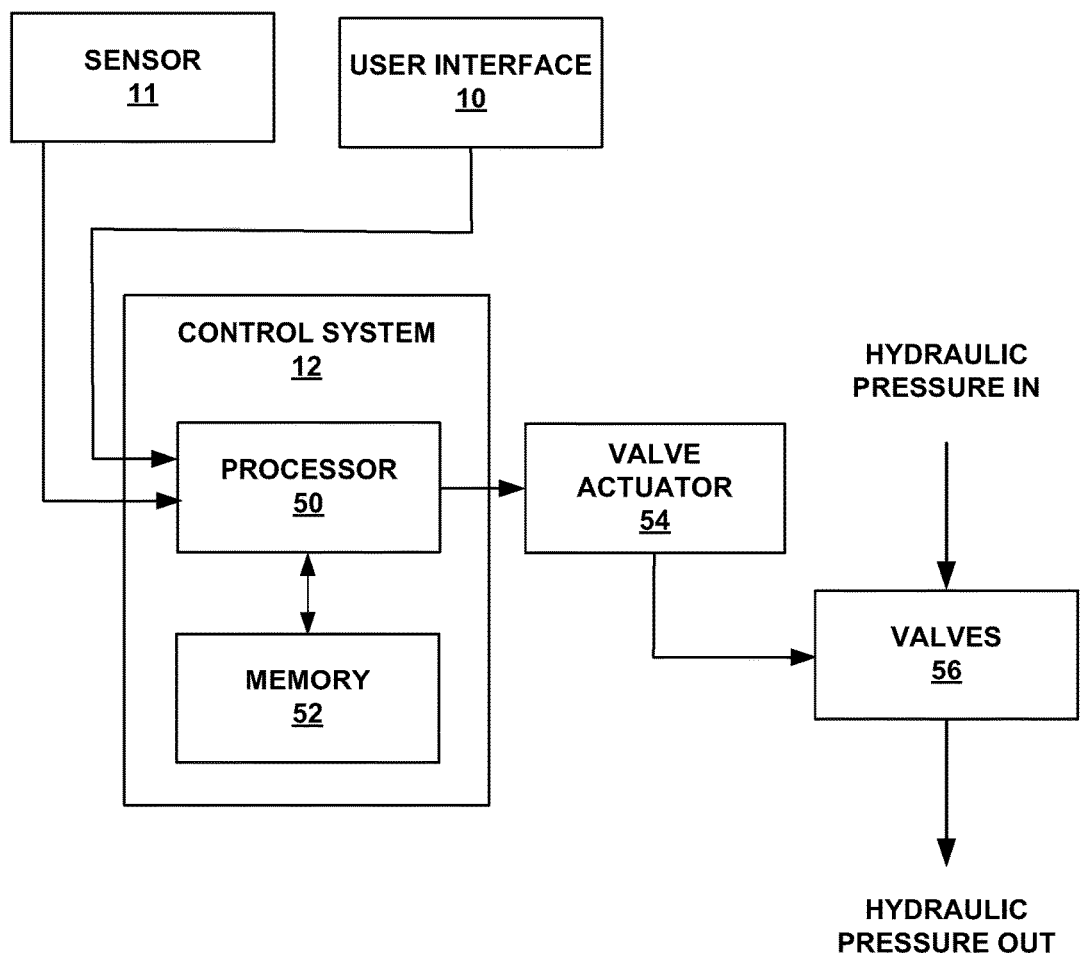
FIG. 4 is a functional block diagram of an example control system for a brake system that includes a brake assembly with a plurality of groups of independently activatable brake actuators.

As discussed with respect to FIG. 4, control system 12 may include any one or more microprocessors, digital signal processors (DSPs), application specific integrated circuits (ASICs), field programmable gate arrays (FPGAs), or any other equivalent integrated or discrete logic circuitry, as well as any combinations of such components. In some examples, various functions attributed to control system 12 may correspond to individual hardware units, such as ASICs, DSPs, FPGAs, or other hardware units, or one or more common hardware units. Control system 12 may also include a memory. The memory may be configured to store data used to operate the braking system of aircraft 2, including brake assembly 8. The memory may, for example, include any volatile or non-volatile media, such as a random access memory (RAM), read only memory (ROM), non-volatile RAM (NVRAM), electrically erasable programmable ROM (EEPROM), flash memory, and the like.

FIG. 2 is a perspective diagram illustrating a portion of example brake assembly 8, which includes rotors 20 and stators 22 interleaved to define brake stack 23, and brake actuator 24. Rotors 20 and stators 22 are each in the form of brake discs in the example shown in FIG. 2, such that brake stack 23 may also be referred to as a brake disc stack 23. In addition, in the example shown in FIG. 2, rotors 20 and stators 22 are stacked in an alternating manner and are disposed such that the major surfaces of rotors 20 and stators 22 are disposed substantially parallel to each other. Under the control of control system 12, brake actuator 24 is configured to move between an engage position and a disengage position. For example, brake actuator 24 may move to the engage position from the disengage position when control system 12 activates the brake actuator. In the engage position, actuator 24 engages compression plate 26, which may be, for example, a stator 22 on an end of brake disc stack 23, and applies a force towards brake disc stack 23. This force moves rotors 20 and stators 22 into engagement with one another, to thereby generate the desired braking force. Brake actuator 24 is depicted in FIG. 2 as a hydraulic piston. As discussed above, in other examples, brake actuator 24 may be pneumatic piston, electrically driven ram, or similar mechanism that is configured to bring rotors 20 and stators 22 into engagement.

Rotors 20 and stators 22 may have any suitable configuration. In the example shown in FIG. 2, stators 22 are mechanically connected (e.g., splined) to torque tube 28, which is mechanically connected to aircraft 2 via landing gear assembly 4 (FIG. 1). Stators 22 do not rotate with aircraft wheels 6 and are stationary relative to landing gear 4. Rotors 20 are attached to, and rotate with, aircraft wheel 6 (FIG. 1). In some examples, rotors 20 may be notched to accept a spline or drive key to facilitate torque transfer to and from aircraft wheels 6. When activated by control system 12, brake actuator 24 may extend an arm, e.g., hydraulic ram 36, into compression plate 26, forcing compression plate 26 towards brake disc stack 23 and compressing rotors 20 and stators 22 together. As the stack of rotors 20 and stators 22 is compressed, rotors 20 and stators 22 frictionally engage each other. An axle, tube or the like is configured to transfer the energy of rotating aircraft wheel 6 to rotors 20, and friction dissipates the transferred energy so that the rotation of rotors 20 and aircraft wheel 6 slows as stators 22 and rotors 20 are compressed together. Stators 22, via torque tube 28, transfer some of the torque of aircraft wheel 6 to landing gear assembly 4 and the fuselage of aircraft 2. As the force that brake actuator 24 applies to compression plate 26 increases, the more rapidly the rotation of aircraft wheel 6 slows, increasing torque on landing gear assembly 4 due to the deceleration of aircraft 2.

In the example shown in FIG. 2, brake actuator 24 is depicted as a hydraulic piston and includes hydraulic fluid input 30, piston head 32, piston case 34, hydraulic ram 36, adjustment arm 38, and spring 40. Piston head 32 and piston case 34 are joined together to form a guide for hydraulic ram 36. Hydraulic ram 36 may slidably engage with the interior of piston case 32 and piston head 34. In the open position, hydraulic ram 36 may retract into the interior of piston head 32 and piston case 34, leaving a gap between the end of hydraulic ram 36 and the interior wall of piston head 32, allowing pressurized hydraulic fluid to accumulate at the top of hydraulic ram 36. Control system 12 may control brake actuator 24 by controlling pump 16 (FIG. 1) to apply hydraulic pressure to hydraulic ram 36 via hydraulic input 30. Hydraulic input 30 is configured to provide hydraulic pressure to the interior of piston head 32, and, as a result, when hydraulic pressure is supplied to hydraulic input 30, the pressure is transmitted to the interior of piston head 32 and forces hydraulic ram 36 to extend towards brake disc stack 23.

Extending hydraulic ram 36 forces rotors 20 and stators 22 into frictional engagement. The extension of hydraulic ram 36 also compresses spring 40. At the completion of braking, pressure is released at hydraulic input 30, and spring 40 returns hydraulic ram 36 to the initial position, allowing aircraft wheel 6 and rotors 20 to rotate. As the energy of braking dissipates through friction, rotors 20 and stators 22 may become worn. To reapply braking force, braking actuator 24 may extend hydraulic ram 36 farther due to the decreased thickness of worn rotors 20 and stators 22. To compensate for the wear of rotors 20 and stators 22, adjustment arm 38 may increase the length of hydraulic ram 36, maintaining the length of the stroke of hydraulic ram 36 that engages rotors 20 and stators 22.

Although one specific example of a hydraulic actuation system is shown in FIG. 2, in other examples, other configurations of hydraulic actuator 24 may also be used.

FIG. 3 is a perspective diagram illustrating an example brake assembly 8 that includes with multiple brake actuators 24A-24F. A section of brake disc stack 23 is removed from the illustration of brake assembly 8 in order to more clearly illustrate torque tube 28 and base pad 44. Brake actuators 24A-24F may each be a brake actuator 24, which was described above with respect to FIG. 2. As discussed above with respect to brake actuator 24, brake actuators 24A-24F are each configured to apply a force to bring rotors 20 and stators 22 into frictional engagement with each other, thereby generating a braking force that may slow the rotation rate of aircraft wheels 6 (FIG. 1).

Brake assembly 8 may be connected to one or more wheels of aircraft 2, such as wheels 6 of aircraft 2 (FIG. 1). For example, an axle (not shown), linking landing gear assembly 4 to aircraft wheel 6, may pass through aperture 42 of brake assembly 8. One or more splines or drive keys (not shown) may mechanically connect rotors 20 to aircraft wheels 6, such that rotors 20 rotate with aircraft wheels 6. Rotors 20 may, for example, be in a fixed rotational position relative to aircraft wheels 6. Torque tube 28 may support stators 22, linking stators 22 to brake assembly 8 and landing gear assembly 4. Stators 22 may be, for example, in a fixed position relative to torque tube 22. Torque tube 28 is configured to hold stators 22 in place, even in the presence of a friction force generated during engagement with rotors 20.

In the example shown in FIG. 3, brake assembly 8 includes six brake actuators 24A-24F, which are arranged substantially symmetrically (nearly or exactly symmetrically) about one face of brake disc stack 23. In other examples, brake actuators 24A-24F may have any suitable arrangement with each other, and may not be substantially symmetrically arranged. In other examples, brake assembly 8 may include two or more brake actuators 24 mounted on one or more faces of brake disc stack 12.

Brake actuators 24A-24F may be hydraulic pistons, as shown in FIG. 3, but, in other examples, may be pneumatic pistons, electrically driven rams, and similar devices. Brake actuators 24A-24F may be divided into groups of brake actuators that are configured to be independently controlled by control system 12. Each group may, for example, include one brake actuator, such that each brake actuator 24A-24F may be independently controlled and activated by control system 12. In other examples, each group may include two or more brake actuators 24A-24F. For example, control system 12 may control brake actuators 24A, 24C, and 24E to activate together as a first group and may control brake actuators 24B, 24D, and 24F to activate together as a second group, where control system 12 can activate the second group is independently of the first group (e.g., at different times or for different durations of time). In this way, brake actuators 24A-24F may be arranged in two independently operable groups with three brake actuators each. The brake actuators 24 of each group may be positioned to form a triangle so as to press compression plate 26 substantially evenly towards brake disc stack 12 to apply relatively uniform compressive force to brake disc stack 12. However, other arrangements of brake actuators 24 of a common group are contemplated.

Brake actuators 24A-24F of a common group are configured to apply compressive force to compression plate 26 (FIG. 2) simultaneously under the control of control system 12 (FIG. 1). Control system 12 may also control multiple groups of brake actuators 24 such that multiple groups of brake actuators 24 compress the brake disc stack during the same braking action. Control system 12 can activate each of brake actuators 24A-24F by, for example, controlling the hydraulic pressure that is supplied to brake actuators 24A-24F through hydraulic inputs. In some examples, each brake actuator is fluidically connected to a respective hydraulic input, from which the actuator receives hydraulic pressure. For example, hydraulic input 30A of brake actuator 24A and hydraulic input 30D of brake actuator 24D is shown in FIG. 3. In other examples, the brake actuators 24 within a group are connected to a common hydraulic input 30, e.g., brake actuators 24A, 24C, and 24E of the first brake actuator group may all be fluidically connected to via hydraulic input 30A. Other arrangements of hydraulic inputs are contemplated, where the arrangement of hydraulic inputs is selected to support activation of a group of brake actuators independently of the other one or more groups of brake actuators 24 of brake assembly 8.

In other examples, brake assembly 8 can include any suitable number of brake actuators (e.g., fewer than six, such as two, three, four or five, or greater than six, such as 8 or more). In addition, while brake assembly 8 is configured such that at least two brake actuators are independently operable to engage with brake disc stack 23, the brake actuators of brake assembly 8 can be arranged in any suitable number of groups that are independently operable from each other, where each group can include one or more brake actuators. For example, brake assembly 8 can include three, four or more groups of independently operable brake actuators, where each group can include one or more actuators.

Processor 50 may store may maintain a designation of which brake actuators 24 belong to which groups in memory 52. In some examples, a brake actuator 24 may be assigned to multiple groups of brake actuators 24. In some examples, brake actuators 24 are arranged into groups and remain in the groups until later reconfigured, e.g., based on user input. In other examples, processor 50 may periodically reconfigure the grouping of brake actuators 24 (e.g., while maintaining the same number of groups and the same number of actuators in each group) throughout the use of brake assembly 8. For example, processor 50 may reconfigure the grouping of brake actuators 24 to help ensure each brake actuator 24 is used relatively regularly, and, in some examples, to help ensure that each brake actuator 24 is used with the about the same frequency to help brake actuators 24 of brake assembly 8 wear relatively evenly. As another example, processor 50 may reconfigure the groupings of brake actuators 24 in response to changing conditions, such as a component failure.

FIG. 4 is a functional block diagram of an example control system 12, which is configured to control brake actuators 24 of brake assembly 8. In the example shown in FIG. 4, control system 12 comprises processor 50 and memory 52. As discussed above, processor 50 may comprise one or more microprocessors, DSPs, ASICs, FPGAs, or any other equivalent integrated or discrete logic circuitry, as well as any combinations of such components, and memory 54 may comprise any volatile or non-volatile media, such as a RAM, ROM, NVRAM, EEPROM, flash memory, and the like.

In the example shown in FIG. 4, control system 12 is configured to activate brake actuators 24 by regulating hydraulic pressure applied to the hydraulic inputs 30. In some examples, control system 12 may be configured monitor the pressure of hydraulic fluid applied to a hydraulic input 30 of one or more brake actuators 24, and control system 12, via one or more valve actuators 54 and one or more valves 56, may control the force applied by brake actuators 24 to brake disc stack 23 by partially opening or closing valves 56 or the pressure supplied by pump 16 (FIG. 1).

Also shown in FIG. 4 is valve actuator 54, which is configured to actuate (e.g., open and close) valves 56. Valves 56 are configured to receive hydraulic pressure, and opening of valves 56 transmits hydraulic pressure through valves 56 to, e.g., a hydraulic input of one or more brake actuators 24, as described in further detail below.

One valve actuator 54 may actuate a single valve 56 or more than one valve 56. Valve actuator 54 is configured, however, to control a group of brake actuators 24 to activate independently of another group. For example, activation of valve actuator 54 to open one or more valves 56 associated with a single group of brake actuators may result in the provision of hydraulic fluid to the brake actuators 24 of the group, but not of another group. In this way, valve actuators 54 and valves 56 of brake assembly 8 may be configured to control a first group of brake actuators 24 separately from a second group of brake actuators 24 so that the first group of brake actuators 24 may be activated to produce a dynamic braking force while the second group of brake actuators 24 is not actuated.

In some examples, valve actuator 54 may be one or more solenoids that actuate valves 56. Upon an electrical signal from processor 50, the solenoids of valve actuator 54 may open or close valves 56, regulating hydraulic pressure into brake actuators 24 of brake assembly 8. In other examples, valve actuator 54 may include one or more electrical motors that are configured to open and close valves 56 under the control of processor 50.

In the example shown in FIG. 4, control system 12 is a processor based system that is configured to control one or more valves 56 via electrical signals in order to control the activation of one or more groups of brake actuators 24, e.g., to modulate the braking force provided to aircraft 2 by brake assembly 8. In other configurations, control system 12 may be a mechanical-based system that is configured to control the application of hydraulic pressure to brake actuators 24 based on mechanical-based signals. While FIG. 4 is described with respect to control system 12 that is configured to control a hydraulically actuated braking system, in other examples, control system 12 may be configured to control other types of braking systems, such as pneumatic or electrically actuated braking systems, using similar techniques.

Processor 50 is configured to receive input from user interface 10, sensor 11, or both, and control the activation of one or more brake actuators 24 of brake assembly 8 in response to the input. In the example shown in FIG. 4, control system 12 is configured to control the activation of one or more brake actuators 24 of brake assembly 8 by controlling the hydraulic pressure provided to the one or more brake actuators 24. In the example shown in FIG. 4, control system 12 is configured to control the hydraulic pressure by controlling the opening of one or more valves 56 via valve actuator 54, where valves 56 are configured to regulate hydraulic pressure and hydraulic fluid supplied to the one or more brake actuators 24 via pump 16 (FIG. 1). For example, control system 12 may control valve actuators 54 to open or partially open valves 56 to supply hydraulic pressure to the hydraulic input 30 (FIG. 3) of one or more brake actuators 24 in order to activate the one or more brake actuators in response to input from user interface 10, sensor 11, or both. As another example, control system 12 may close or partially close valves 56 to reduce the hydraulic pressure provided to the hydraulic input 30 of one or more brake actuators 24 in order to deactivate the one or more brake actuators in response to input from user interface 10, sensor 11, or both.

In some examples, if a group of brake actuators 24 includes two or more actuators, processor 50 may control the activation of each brake actuator of a group of brake actuators 24 (described above) via a single valve 56 in examples in which each brake actuator 24 of the group is fluidically coupled to a common valve 56. Opening the single valve 56 may, for example, cause hydraulic fluid to be introduced into the respective hydraulic lines for each brake actuator in the group, which may then cause the hydraulic piston of each actuator 24 to move towards compression plate 26 (FIG. 3) to compress brake disc stack 23. In this way, processor 50 may activate the group of brake actuators 24 in an efficient manner.

In other examples, processor 50 may control the activation of each brake actuator of a group of brake actuators 24 via a set of valves 56, where each brake actuator 24 may be fluidically coupled to a respective valve 56. For example, each brake actuator 24 may be associated with a respective valve 56 and hydraulic line, and processor 50 may control the activation of each brake actuator of a group of brake actuators 24 by opening or closing the valves 56 associated with each brake actuator 24 in the group. Opening a valve 56 may, for example, cause hydraulic fluid to be introduced into the respective hydraulic line for the respective brake actuator, which may then cause the hydraulic piston to actuate towards compression plate 26 (FIG. 3) to compress brake disc stack 23. Other configurations of valve actuators, valves, and hydraulic lines that enable processor 50 of control system 12 to independently operate group of brake actuators 24 in order to modulate the braking force applied to wheels 6 (FIG. 1) of aircraft 2 based on input from user interface 10, sensor 11, or both, may also be used.

As discussed above, processor 50 is configured to receive a signal from user interface 10, sensor 11, or both, and determine the relative amount of braking force to be provided by brake assembly 8 based on the one or more signals. For example, processor 50 may be electrically connected to user interface 10 and sensor 11 via a wired or wireless connection. In some examples, processor 50 determines the relative amount of braking force by determining the type of braking event that is indicated by the input from user interface 10, sensor 11, or both, and the number of brake actuators 24 associated with the determined type of braking event. For example, processor 50 may determine whether the one or more signals indicate a first type of braking event or a second type of braking event is occurring. The first type of braking event may correspond to a normal braking event, e.g., during normal taxiing of the aircraft or during a non-emergency landing event. Processor 50 may, for example, activate first number of groups of brake actuators 24 in response to detecting the first type of braking event. The number of groups to activate may be, for example, associated with the first type of braking event in memory 52. In some examples, a user (e.g., a pilot or other crew member) may provide input, via user interface 10, indicating the first type of braking event is occurring by depressing a brake pedal (e.g., in a cockpit of aircraft 2) a moderate amount (e.g., less than the maximum depressible amount). Sensor 11 may be associated with the brake pedal and may be configured to detect the extent of depression of the brake pedal by the user; sensor 11 may be configured to generate a signal indicative of the extent of depression of the brake pedal and provide the signal to processor 50, from which processor 50 may detect the first type of braking event.

The second type of braking event may correspond to a higher desired braking force, such as a braking force that is sufficient for emergency landing events, engine run-up events, or aborted takeoff events. Processor 50 may, for example, activate second number of groups of brake actuators 24 in response to detecting the first second type of braking event. The second number of groups of brake actuators 24 is larger than the first number of groups of brake actuators activated in response to the detection of the first type of braking event. In some examples, the second number of groups of brake actuators 24 is configured, when a maximum hydraulic pressure is applied to the brake actuators 24, to provide a maximum braking force that brake system 8 is configured to provide. The second number of groups to activate may be, for example, associated with the second type of braking event in memory 52.

In some examples, a user (e.g., a pilot or other crew member) may provide input, via user interface 10, indicating the second type of braking event is occurring by depressing a brake pedal (e.g., in a cockpit of aircraft 2) a relatively large amount (e.g., the maximum depressible amount), by flipping a switch or pushing a button of user interface 10, where activation of the switch or button indicates engine run-up, aborted takeoff, or an emergency landing situation, or both. Processor 50 may receive the signal from sensor 11 to detect the first type of braking event and then subsequently reference memory 52 to determine how many brake actuators 24 to activate.

In some examples in which processor 50 activates less than all of the brake actuators 24 in response to input from user interface 10, sensor 11, or both, processor 50 may also determine which of the plurality of brake actuators 24 or groups of brake actuators 24 to select to activate to produce the braking force. In some cases, it can be desirable for processor 50 to periodically activate each of the brake actuators 24 of brake assembly 8 in order to keep the actuators 24 in use relatively regularly, which may increase the lifespan of the brake actuators. Thus, from one braking event to another, different brake actuators 24 may be activated, even if the braking events are all of the same type. In addition, in some examples, brake actuators 24 include an internal adjuster mechanism that adjusts the position of the hydraulic pistons in response to the wear state of brake stack 23, such that the hydraulic pistons may be moved (in a direction towards brake stack 23) as brake stack wears 23 so as to maintain a desired clamping force. Periodically changing which brake actuators 24 are used during normal braking events may help keep the internal adjuster mechanism set to the current wear state of brake stack 23.

Processor 50 may implement any suitable algorithm to select the group of brake actuators 24 to activate in response to the detection of a braking event in order to maintain usage of all of brake actuators 24. In some examples, processor 50 may cycle through the groups of brake actuators, such that the brake actuators activated in response to detecting the first type of braking event or the second type (if less than all the groups are activated in response to the detection of the second type of braking event) are selected in a predetermined order (e.g., in an alternating manner in examples in which there are only two group of brake actuators). In some examples, processor 50 may store, in memory 52, a history of which group of brake actuators 24 were activated in response to the detection of past braking events. The history may, for example, include the number of times and when each brake actuator 24 or group of brake actuators 24 was activated under the control of processor 50. This information may later be retrieved by processor 50 to select one or more groups of brake actuators to activate in response to the detection of a braking event for which less than all of the actuators are activated, or the information may later be retrieved by a user to evaluate brake assembly 8 (e.g., to evaluate wear of brake actuators 24).

Memory 17 may also store instructions that, when executed by processor 50, cause processor 50 to perform any of the functions described herein, such as to detect a first type or a second type of braking event and determine which group of brake actuators 24 to activate in response to the determined type of braking event.

Figure 5:
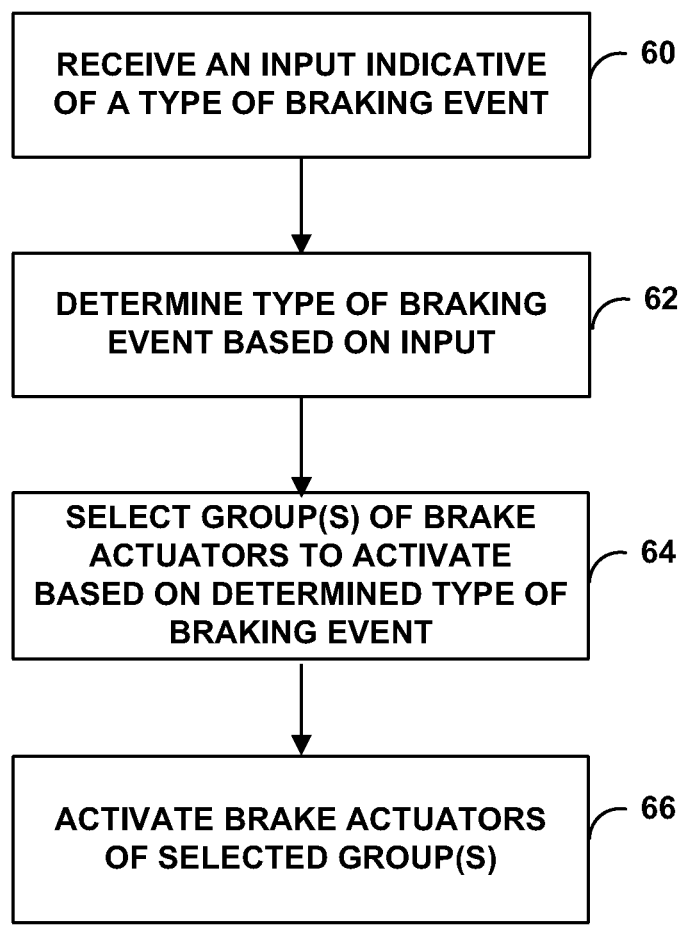
FIG. 5 is a flow diagram of an example method of operating a brake assembly that includes at least two independently activatable groups of brake actuators.
Figure 6:
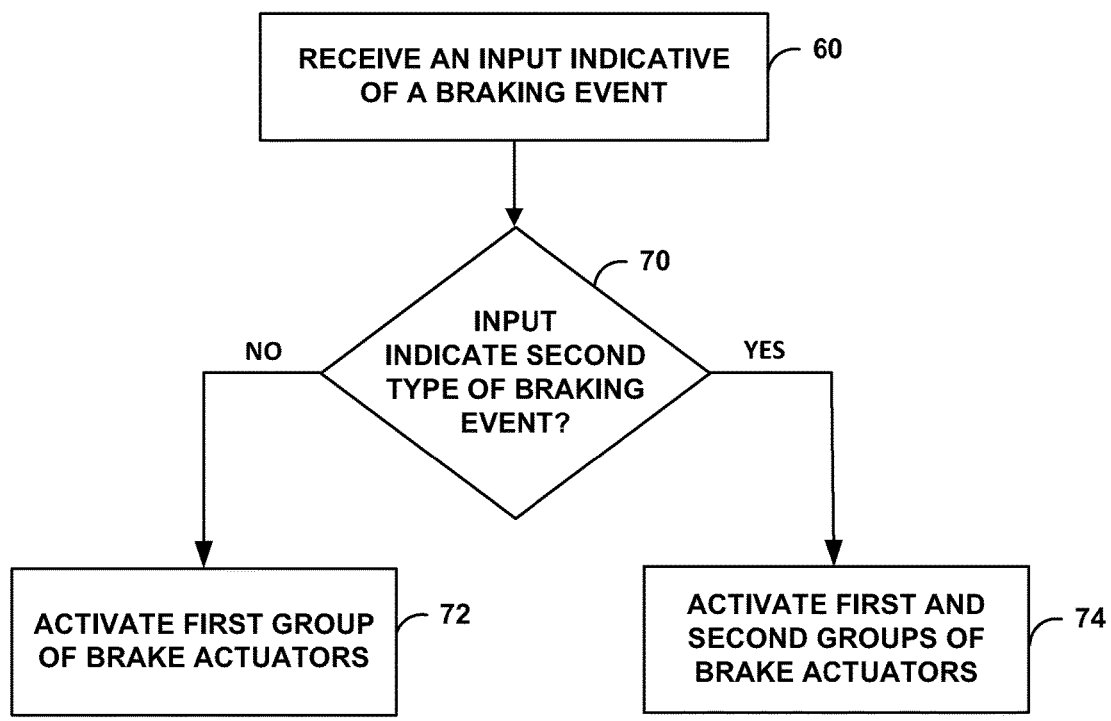
FIG. 6 is a flow diagram of an example method of selecting one or more groups of brake actuators to produce an indicated braking force.

FIG. 5 is a flow diagram illustrating an example technique of operating brake assembly 8 (FIG. 1). While FIGS. 5 and 6 are primarily described with respect to processor 50 of control system 12, in other examples, a processor of another control system or another device may perform any part of the techniques shown in FIGS. 5 and 6, alone or in combination with processor 50.

In accordance with the technique shown in FIG. 5, processor 50 of control system 12 (FIG. 4) may receive an input that indicates a type of braking event that is occurring or about to occur (60). The input may be, for example, a signal generated by user interface 10, sensor 11, or both. For example, as discussed above, user interface 10 may include a brake pedal located in the cockpit of aircraft 2 (FIG. 1). The distance the pilot depresses the brake pedal may be user input indicating the type of braking event—the farther the brake pedal is depressed the greater the desired braking force indicated, which is then associated with a type of braking event. In some of these examples, the input to processor 50 may be a change in hydraulic or pneumatic pressure (e.g., depressing the brake pedal may actuate a valve, which then transmits hydraulic pressure to control system 12), mechanical movement, or an electrical signal generated by a sensor that indicates the extent to which the brake pedal was depressed. As another example, user interface 10 may indicate a switch that, when actuated by a user, indicates an occurrence of a second type of braking event, such as an emergency landing event, an engine run-up event or an aborted takeoff event.

Processor 50 may determine whether the input indicates the first type of braking event or the second type of braking event (62). As an example, processor 50 may determine that if a signal from sensor 11 indicates that a brake pedal of user interface 10 is depressed less than (or less than or equal to in other examples) a first threshold amount (the threshold amount may be stored by memory 52), the input indicates a normal braking event, which is a first type of braking event. As examples, the threshold amount can be a hydraulic pressure value, a distance value (e.g., as indicated by an amplitude or other signal characteristic of an electrical signal), or the like. If the sensor signal indicates the brake pedal is depressed greater than or equal to (or greater than in other examples) the first threshold amount (or, in other examples, a second threshold amount different than the first), processor 50 may determine the input indicates a second type of braking event, such as an engine run-up event, an emergency braking event, or an aborted takeoff event. Other techniques for determining whether the input indicates the first type of braking event or the second type of braking event, including those described above with respect to the other figures, may also be used.

In response to determining the type of braking event indicated by the input, processor 50 may select the groups of actuators 24 to activate based on the determination (64). Because a greater braking torque may be desirable to slow or stop aircraft 2 during the second type of braking event, the first type of braking event may be associated with a first number of groups of actuators 24 while the second type of braking event with a second number of groups of actuators, which is greater than the first number. Processor 50 may select the groups of actuators 24 accordingly. As discussed above, in some examples, memory 52 stores information associating the first type of braking event with a certain number of groups of brake actuators (e.g., one group of brake actuator or half of the number of groups of brake assembly 8) and information associating the second type of braking event with a certain number of groups of brake actuators (e.g., two groups of brake actuator or all of the groups of actuators 24 of brake assembly 8). Thus, in some examples, processor 50 may select the number of groups of brake actuators 24 to activate (64) by referencing information stored by memory 52.

In some examples, the first number of groups of brake actuators 24 associated with the first type of braking event is half of the number of groups of brake actuators of brake assembly 8, and the second number of groups of brake actuators 24 associated with the second type of braking event is all of the groups of brake actuators 24 of brake assembly 8. Other ratios between the first number and the second number of groups of brake actuators 24 are contemplated.

Processor 50 may select the specific groups of actuators 24 to activate (64). If, for example, braking system 8 only includes two groups, processor 50 may select one group in response to detecting the first type of braking event and select both groups in response to detecting the second type of braking event. In some examples, processor 50 may be configured to always select the same group of brake actuators in response to detecting the first type of braking event.

In other examples, as discussed above, processor 50 may be configured to periodically change which one or more groups of brake actuators are activated in response to detecting the first type of braking event. For example, as discussed above, from one detection of the first type of braking event, in which less than all of the brake actuators of brake assembly 8 are activated, to the next, processor 50 may activate different groups of brake actuators 24 in order to help maintain relatively regular usage of all of the brake actuators 24. In some examples, processor 50 may reference historical usage data stored by memory 52, implement an algorithm, or implement any other technique to select the groups such that brake actuators 24 of assembly 8 are used relatively regularly. If, for example, braking system 8 only includes two groups of brake actuators 24, processor 50 may select one group in response to detecting the first type of braking event and, the next time the first type of braking event is detected, may select the other group of actuators 24 to activate. In this way, processor 50 may be configured to alternate which one or more groups of brake actuators are activated in response to detecting the first type of braking event.

In some examples, processor 50 may be configured to select the one or more groups of brake actuators 24 to activate in response to detecting the first type of braking event based on the time elapsed since the one or more groups were last actuated. For example, in examples in which processor 50 activates a single group of brake actuators in response to detecting the first type of braking event, processor 50 may select the group of brake actuators 24 that have gone the longest without being actuated.

In some examples, processor 50 may also determine which groups of brake actuators 24 to activate based on a range of additional factors including, for example, the weight of aircraft 2, the speed of aircraft 2, the thrust engines 14 may generate, and maximum allowable stopping distance. Factors such as an increased weight or speed of aircraft 2 may increase the amount of energy that brake assembly 8 must dissipate during a braking action, and, as a result, processor 50 may control more groups of brake actuators 24 to maintain the same stopping distance.

After selecting the groups of brake actuators to activate (64), processor 50 may activate the brake actuators 24 of the selected groups (66). For example, processor 50 may control the appropriate valve actuators 54 (FIG. 4), i.e., the valve actuators 54 that control the opening and closing of the one or more valves 56 (FIG. 4) fluidically connected to the brake actuators 24 of the selected groups, to open the valves 56 in order to introduce hydraulic fluid into the brake actuators 24 of the selected groups. The hydraulic fluid may then cause the hydraulic pistons of the brake actuators 24 to actuate towards brake disc stack 23 and apply a force to compression plate 26 to compress rotors 20 and stators 22 of brake disc stack 23 together.

If actuators 24 are actuators other than hydraulic actuators, processor 50 may activate brake actuators 24 of the selected groups using other techniques, such as by supplying pneumatic pressure or electricity to the actuators, or transmitting a signal to a motor control system or similar device operating brake actuator 24 indicating the compressive force brake actuators 24 should apply.

During and after a braking event, control system 12 may continue to monitor user interface 10 and other sensors 11 to determine whether to increase, reduce, or maintain the braking force generated by brake assembly 8. For example, control system 12 may activate one or more additional groups of brake actuators 24 as conditions warrant, where the conditions may be based on input received by control system 12. In some examples, processor 50 may activate the additional groups of brake actuators 24 without releasing the clamping force applied by the one or more groups of brake actuators 24 previously activated. In another example, control system 12 may activate additional groups of brake actuators 24 in response to a failure in a group of brake actuators 24 currently selected to compress brake disc stack 23. In addition, control system 12 may deactivate brakes in response to input from one or both of user interface 10 or sensors 11. As an example, control system 12 may reduce (e.g., while still maintaining some braking force or to completely deactivate) hydraulic pressure applied to brake actuators 24 to deactivate brake actuators 24 in response to input from a brake pedal position that indicates less braking force is desired by the user. The brake pedal position may, for example, indicate that the user has lifted off the brake pedal such that no braking force is desirable.

In some examples, processor 50 determines whether the input it receives from user interface 10, sensor 11 or both is indicative of the first type of braking event or the second type of braking event by detecting input indicative of a braking event and determining whether the input is indicative of the second type of braking event. FIG. 6 is a flow diagram of an example technique for controlling brake assembly 8 to selectively activate two groups of brake actuators 24 based on a determination of whether input from user interface 10, sensor 11 or both is indicative of the second type of braking event. While FIG. 6 is described with respect to brake assembly 8 that is configured such that there are two groups of brake actuators (e.g., with three brake actuators in each group), the technique shown in FIG. 6 can also be used to control a brake assembly with multiple brake actuators arranged into a different number of groups, which may or may not have the same number of brake actuators.

In accordance with the technique shown in FIG. 6, processor 50 receives input indicative of a braking event (60), e.g., using the techniques described above with respect to FIG. 5. However, in contrast to FIG. 5, rather than positively determining whether the input is indicative of a first type of braking event or a second type of braking event, in the example shown in FIG. 6, processor 50 determines whether the input is indicative of the second type of braking event (70). For example, processor 50 may determine whether input from user interface 10 indicates a user activated a switch, button or the like to indicate an engine run-up event, an emergency landing event, or an aborted takeoff event. As another example, processor 50 may determine whether input from user interface 10 and sensor 11 indicates the user depressed a brake pedal at least a threshold amount that is associated with a second type of braking event. In addition, or instead, processor 50 may determine whether input from user interface 10 and sensor 11 (which may include multiple sensors) indicates the brake pedal is depressed, aircraft 2 is not moving, and a throttle in a cockpit of aircraft 2 is advanced, thereby indicating an engine run-up event. Other techniques for determining whether input from user interface 10, sensor 11 or both indicate the second type of braking event (70) may also be used.

In response to determining that that the input does not indicate the second type of braking event (70), processor 50 may activate a first group of brake actuators (72). Thus, processor 50 may be configured to activate only the first group of brake actuators as a default braking operation. In response to determining that the input does indicates the second type of braking event (70), processor 50 may activate the first group of brake actuators and a second group of brake actuators (74). In this way, processor 50 may control brake assembly 8 to provide additional braking force upon determining the input from user interface 10, sensor 11 or both indicates a second type of braking event is occurring or is about to occur.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A system comprising:
   a brake assembly comprising:
      a brake stack; and
      a plurality of brake actuators, each brake actuator being configured to compress the brake stack when the brake actuator is activated; and
   a processor configured to modify a braking force applied by the brake assembly by at least modifying a number of brake actuators of the plurality of brake actuators that are activated, wherein the processor is configured to modify the braking force by at least detecting a first type of braking event and activating a first number of brake actuators of the plurality of brake actuators to compress the brake stack with a first braking force in response to detecting the first type of braking event, and detecting a second type of braking event and activating a second number of brake actuators of the plurality of brake actuators to compress the brake stack with a second braking force in response to detecting the second type of braking event, the first number being less than the second number, and the first braking force being less than the second braking force, and wherein the second type of braking event comprises an emergency landing event, an aborted takeoff event, or an engine run-up event, wherein each brake actuator of the plurality of brake actuators comprises a hydraulic piston.

2. The system of claim 1, wherein the first number of brake actuators comprises half of the brake actuators of the plurality of brake actuators and the second number of brake actuators comprises all of the brake actuators of the plurality of brake actuators.

3. The system of claim 1, further comprising a user interface, wherein the processor is configured to detect the second type of braking event based on input from the user interface.

4. The system of claim 3, wherein the user interface comprises a brake pedal, the brake pedal being depressible, wherein the processor is configured to detect the second type of braking event based on a distance the brake pedal is depressed.

5. The system of claim 4, further comprising a sensor, wherein the sensor is configured to generate a signal indicative of the distance the brake pedal is depressed, and wherein the processor is configured to receive the signal and detect the second type of braking event based on the signal.

6. The system of claim 5, further comprising a memory that stores a threshold value, wherein the processor is configured to compare an amplitude of the signal to the threshold value and determine whether the signal is indicative of the second type of braking event based on the comparison.

7. The system of claim 3, wherein the processor is configured to detect the second type of braking event by at least receiving input from a user, via the user interface, indicating at least one of an emergency landing event, an aborted takeoff event or an engine run-up event.

8. The system of claim 1, further comprising:
   an aircraft comprising the brake assembly and the processor; and
   a sensor configured to generate a signal indicative of a condition of the aircraft, wherein the processor is configured to receive the signal from the sensor and detect the second type of braking event based on the signal.

9. The system of claim 1, further comprising:
   a brake pedal configured to receive input from a user, wherein the brake pedal is depressible; and
   an aircraft wheel, wherein the brake assembly is configured to slow rotation of the aircraft wheel, and
   wherein the processor is configured to detect the second type of braking event by at least detecting depression of the brake pedal and determining the aircraft wheel was not rotating prior to depression of the brake pedal by the user.

10. The system of claim 1, wherein the processor is configured to alternate the brake actuators of the plurality of brake actuators that are activated in response to detection of the first type of braking event.

11. The system of claim 1, wherein the processor is configured to, in response to detecting the first type of braking event, determine which brake actuators of the plurality of brake actuators have been operated a least amount of time, and select the first number of brake actuators from among the actuators of the plurality of brake actuators that have been operated the least amount of time.

12. The system of claim 1, wherein the processor is configured to activate the first number of brake actuators to fully engage with the brake stack to compress the brake stack with the first braking force in response to detecting the first type of braking event, and wherein the second number of brake actuators comprises all of the brake actuators, the processor is further configured to activate all of the brake actuators to fully engage with the brake stack to compress the brake stack with the second braking force in response to detecting the second type of braking event.

13. A system comprising:
   a brake assembly comprising:
      a friction brake comprising a rotating member and a stationary member;
      a first group of brake actuators configured to engage the rotating member and the stationary member with each other, wherein each brake actuator of the first group of brake actuators comprises a hydraulic piston;
      a second group of brake actuators configured to engage the rotating member and the stationary member with each other, wherein each brake actuator of the second group of brake actuators comprises a hydraulic piston; and a control system configured to modify a braking force applied by the brake assembly by at least selectively activating one or both of the first and second groups of brake actuators, wherein the control system is configured to modify the braking force by at least detecting a first type of braking event and independently activating one of the first group of brake actuators or the second group of brake actuators to engage the rotating member and the stationary member with each other with a first braking force in response to detecting the first type of braking event, wherein the control system is further configured to modify the braking force by at least detecting a second type of braking event and activating both the first and second groups of brake actuators to engage the stationary member and the rotating member with each other with a second braking force in response to detecting the second type of braking event, the first braking force being less than the second braking force, and wherein the second type of braking event comprises an emergency landing event, an aborted takeoff event, or an engine run-up event.

14. The system of claim 13, further comprising at least one of a user interface or a sensor, wherein the control system is configured to detect the first type of braking event based on input from the at least one of the user interface or the sensor, and wherein the control system is configured to detect the second type of braking event based on input from the at least one of the user interface or the sensor.

15. The system of claim 13, wherein the control system is configured to periodically select between activating the first group of brake actuators to engage the stationary member and the rotating member with each other and activating the second group of brake actuators to engage the stationary member and the rotating member with each other in response to detecting the first type of braking event.

16. The system of claim 14, wherein the user interface comprises a brake pedal, the brake pedal being depressible, wherein the control system is configured to detect the second type of braking event based on a distance the brake pedal is depressed by a user.

17. The system of claim 14, where the control system is configured to detect the second braking condition by receiving input from a user, via the user interface, indicating at least one of an emergency landing event, an engine run-up event, or an aborted takeoff event.

18. A method comprising:
receiving, by a processor of a braking system, input indicative of a type of braking event, the braking system further comprising a brake assembly comprising:
a brake stack; and
a plurality of brake actuators, each brake actuator being configured to compress the brake stack when the brake actuator is activated, wherein each brake actuator of the plurality of brake actuators comprises a hydraulic piston;
determining, by the processor, the type of braking event based on the input; and
modifying, by the processor, a braking force applied by the brake assembly by at least modifying a number of brake actuators of the plurality of brake actuators that are activated, wherein modifying the braking force applied by the brake assembly comprises:
activating, by the processor, a first number of brake actuators of the plurality of brake actuators to compress the brake stack with a first braking force in response to determining a first type of braking event; and
activating, by the processor, a second number of brake actuators of the plurality of brake actuators to compress the brake stack with a second braking force in response to determining a second type of braking event, the first number being less than the second number, and the first braking force being less than the second braking force, and wherein the second type of braking event comprises an emergency landing event, an aborted takeoff event, or an engine run-up event.

19. The method of claim 18, wherein receiving the input indicative of a type of braking event comprises receiving input indicative of an extent of depression of a brake pedal.

* * * * *